(12) United States Patent
Myers et al.

(10) Patent No.: US 6,777,377 B2
(45) Date of Patent: Aug. 17, 2004

(54) COMPOSITION FOR USE IN SEALING A POROUS SUBTERRANEAN FORMATION, AND METHODS OF MAKING AND USING

(75) Inventors: Kent R. Myers, Billings, MT (US); Richard K. Brown, Billings, MT (US); Stewart W. Krause, Billings, MT (US); Shobha B. Parekh, Billings, MT (US); Robert W. Stichman, Billings, MT (US)

(73) Assignee: Wyo-Ben, Inc., Billings, MT (US)

( * ) Notice: Subject to any disclaimer, the term of this patent is extended or adjusted under 35 U.S.C. 154(b) by 0 days.

(21) Appl. No.: 10/308,114

(22) Filed: Dec. 3, 2002

(65) Prior Publication Data

US 2003/0104949 A1 Jun. 5, 2003

Related U.S. Application Data

(60) Provisional application No. 60/334,595, filed on Dec. 3, 2001.

(51) Int. Cl.⁷ .............................. C09K 7/02; C09K 7/00; E21B 33/13
(52) U.S. Cl. ................ 507/120; 507/902; 507/119; 507/118; 507/104; 507/221; 507/224; 507/225; 507/204; 175/72; 428/402.24; 166/284; 166/295
(58) Field of Search ......................... 507/902, 118–120, 507/104, 221, 224, 225, 204; 175/72; 428/402.24; 166/284, 295

(56) References Cited

U.S. PATENT DOCUMENTS

| | | | |
|---|---|---|---|
| 2,683,690 | A | 7/1954 | Armentrout |
| 2,800,964 | A | 7/1957 | Garrick |
| 2,836,555 | A | 5/1958 | Armentrout |
| 2,856,354 | A * | 10/1958 | Armentrout ................ 507/117 |
| 3,028,913 | A | 4/1962 | Armentrout |
| 3,039,529 | A | 6/1962 | McKennon |
| 3,053,764 | A | 9/1962 | Hummel et al. |
| 3,078,920 | A | 2/1963 | Brink |
| 3,082,823 | A | 3/1963 | Hower |
| 3,198,252 | A | 8/1965 | Walker et al. |
| 3,448,800 | A | 6/1969 | Parker et al. |
| 3,467,208 | A | 9/1969 | Kelly, Jr. |
| 3,724,564 | A | 4/1973 | Messenger |
| 3,724,565 | A | 4/1973 | Kelly, Jr. |
| 3,780,806 | A | 12/1973 | Bott |
| 3,785,437 | A | 1/1974 | Clampitt et al. |
| 3,921,733 | A | 11/1975 | Clampitt |
| 3,981,363 | A | 9/1976 | Gall |
| 4,014,394 | A | 3/1977 | Bailey |
| 4,123,381 | A * | 10/1978 | Morishita et al. ............. 502/62 |
| 4,182,417 | A | 1/1980 | McDonald et al. |
| 4,261,422 | A | 4/1981 | White et al. |
| 4,282,928 | A | 8/1981 | McDonald et al. |
| 4,391,925 | A | 7/1983 | Mintz et al. |
| 4,439,328 | A | 3/1984 | Moity |
| 4,442,241 | A | 4/1984 | Drake et al. |
| 4,445,576 | A | 5/1984 | Drake et al. |
| 4,463,808 | A | 8/1984 | Mason et al. |
| 4,475,594 | A | 10/1984 | Drake et al. |
| 4,498,995 | A | 2/1985 | Gockel |
| 4,500,670 | A | 2/1985 | McKinley et al. |
| 4,503,170 | A | 3/1985 | Drake et al. |
| 4,551,256 | A | 11/1985 | Kita et al. |
| 4,568,708 | A | 2/1986 | Mason et al. |
| 4,614,235 | A | 9/1986 | Keener et al. |
| 4,633,950 | A | 1/1987 | Delhommer et al. |
| 4,635,726 | A | 1/1987 | Walker |
| 4,664,816 | A | 5/1987 | Walker |
| 4,683,949 | A | 8/1987 | Sydansk et al. |
| 4,704,213 | A * | 11/1987 | Delhommer et al. .......... 175/72 |
| 4,744,419 | A | 5/1988 | Sydansk et al. |
| 4,836,940 | A | 6/1989 | Alexander |
| 4,856,596 | A | 8/1989 | Hamernik |
| 4,923,753 | A * | 5/1990 | Walles et al. .......... 428/102.24 |
| 4,948,428 | A | 8/1990 | Liao |
| 4,957,166 | A | 9/1990 | Sydansk |
| 4,981,520 | A | 1/1991 | Hoskin et al. |
| 4,989,673 | A | 2/1991 | Sydansk |
| 4,991,652 | A | 2/1991 | Hoskin et al. |
| 5,002,980 | A | 3/1991 | Phelps et al. |
| 5,035,287 | A | 7/1991 | Cayias et al. |
| 5,067,564 | A | 11/1991 | Sydansk |
| 5,079,278 | A | 1/1992 | Mitchell |
| 5,086,841 | A | 2/1992 | Reid et al. |
| 5,125,456 | A | 6/1992 | Hutchins et al. |
| 5,244,936 | A | 9/1993 | Mitchell |
| 5,389,146 | A | 2/1995 | Liao |
| 5,407,909 | A | 4/1995 | Goodhue, Jr. et al. |
| 5,418,217 | A | 5/1995 | Hutchins et al. |
| 5,476,543 | A | 12/1995 | Ryan |
| 5,789,349 | A | 8/1998 | Patel |
| 5,849,674 | A | 12/1998 | Fox et al. |
| 5,919,736 | A | 7/1999 | Lithgow |
| 6,105,674 | A | 8/2000 | Liao et al. |
| 6,143,699 | A | 11/2000 | Zhou |

* cited by examiner

Primary Examiner—Philip C. Tucker
(74) Attorney, Agent, or Firm—Clark & Brody

(57) ABSTRACT

A composition for sealing porous subterranean formations comprises a mixture of a water-swellable clay and a water insoluble, water absorbent, water-swellable polymer, wherein the mixture is coated with a material that is resistant to penetration by water. The water penetration resistant material helps the delay the onset of swelling of the clay and polymer until it reaches the formations intended for sealing. Mixing the clay with the water-swellable polymer prior to coating assists in coating of the water-swellable polymer with the water penetration resistant material. The coated mixture can be suspended in an aqueous liquid, and then pumped into a subterranean cavity to seal porous formations therein.

32 Claims, No Drawings

COMPOSITION FOR USE IN SEALING A POROUS SUBTERRANEAN FORMATION, AND METHODS OF MAKING AND USING

This application claims priority under 35 USC 119 (e) from provisional application No. 60/334,595 filed on Dec. 3, 2001.

FIELD OF THE INVENTION

This invention relates, generally, to compositions and methods useful for sealing or plugging porous or fractured subterranean formations encountered during the drilling of vertical or horizontal earthen boreholes, or during the excavation of earthen trenches, while fluid is flowing into or out of the borehole or trench. The invention also generally relates to compositions and methods useful for sealing or plugging porous or fractured formations associated with any subterranean cavity, which may have fluids flowing into or out of it. More specifically the invention relates to compositions and methods involving coated mixtures of bentonite and water-swellable polymer which, when mixed with an aqueous fluid, result in a pumpable suspension useful for sealing or plugging porous or fractured subterranean formations.

BACKGROUND ART

Rotary drilling methods have long been used to drill vertical boreholes to reach subterranean aquifers, oil and gas reservoir zones and mineral deposits. In most of these boreholes a drilling fluid comprised of water, clay, especially bentonite, polymers, weighting materials and other additives is used to lubricate the drill pipe as it rotates in the bore, cool the drill head as it cuts through the formations and carry the soil and rock cuttings produced during the process back to the surface. If the circulating drilling fluid were to be rapidly lost to porous formations encountered during drilling, so that it could not be quickly and fully replaced, the integrity of the bore might be compromised. For this reason the development of a wide variety of lost circulation control agents has long been a priority in the drilling industry.

More recently vertical drilling techniques have been adapted for the drilling of relatively shallow, horizontal bores using a process known as horizontal directional drilling. The typical depth for most horizontal directional drill bores is less than 50 feet below the surface. This process is used to install such things as oil, gas, water and sewer pipelines, and power and telecommunications cables without the need for extensive surface excavations. The limited impact that this method has on streets, highways and other surface infrastructure makes it particularly useful in metropolitan areas.

The horizontal orientation of the borehole in this method results in a large amount of friction between the drill pipe and the borehole. This makes it impractical to rapidly rotate the drill pipe to power the drill head and enable it to bore the hole, as is typically done in vertical bores. As a result, alternate methods of drilling have been developed. The simplest and most often used of these methods relies on pumping a fluid under high pressure through the drill pipe and out through small openings in a "duck-bill" shaped drill bit where it acts to hydraulically cut through the soil that the bore is penetrating. When this technique is employed it is standard practice for the drilling fluid to be composed of water, or water and bentonite clay. The drill pipe is then advanced through the soil as it is cut and flushed away by the hydraulic action of the drilling fluid at the drill bit. It is quite common in this type of drilling for all of the drilling fluid, and the drill cuttings that it contains, to be lost into the formation that is being drilled. This method is very effective in relatively soft, loose and unconsolidated soil, sand or gravel zones. It is not effective in hard rock situations, however.

When hard rock is encountered a drilling method is used that employs a rotating tri-cone bit similar to that used in most vertical drilling operations. In vertical drilling the rotation of the drill pipe also rotates the drill bit allowing the teeth on the cones to cut the formation into small pieces that can be flushed out of the hole. In horizontal directional drilling the friction of the drill pipe against the bore hole, especially along the bottom of the hole where the pipe usually lies, makes it impractical to rapidly rotate the drill pipe to power the drill bit. Instead, a "mud motor" located within the drill pipe, that is powered by the hydraulic movement of the drilling fluid through the pipe, is used to rotate the head of the drill bit.

In order to effectively use a mud motor a sufficient volume of drilling fluid must pass through the motor to turn it. If the volume of drilling fluid is insufficient then the motor will stop working. This makes it critical to immediately replace any drilling fluid lost to highly porous zones encountered during drilling in order to ensure continued operation of a mud motor system. Unfortunately, most horizontal directional drilling equipment has only limited ability to mix and store fresh drilling fluids. As a result, the use of mud motor-driven equipment is often difficult or impossible in highly fractured rock or in zones of large rock cobbles where significant loss of drilling fluids to the formation is common. For this reason it is particularly important that the loss of drilling fluids to the formation be controlled so that the drilling fluid can be returned to the surface where it can be cleaned and reused.

Drilling fluid technology has also been adapted for use in the excavation of earthen trenches for foundation and subterranean hydraulic barrier construction. In this application the excavation fluid is primarily used to stabilize the trench walls. When properly practiced the technique is sufficiently successful to enable excavation through unstable soils, such as loose sands, to depths of 50 to 100 feet or more. Where excavation fluid is rapidly lost from the trench into the formation the integrity of the trench walls can be compromised often leading to wall collapse.

Many attempts have been made over the years to devise methods of controlling the loss of fluids to porous subterranean formations during all types of drilling and excavation operations. The references cited here provide a listing of many of the patented technologies that have been invented for this purpose. These technologies suffer from being too complex, too difficult to use, too imprecise and difficult to properly position in the borehole so as to adequately and consistently seal the desired zone in the formation, or too prone to premature gellation causing problems in mixing, pumping or placement. This is particularly true for small drilling operations such as are typical for water, mineral exploration and environmental monitoring wells or for horizontal directional drilling. In these cases it is necessary to have a simple method of easily placing a sealant and plugging agent that will not plug the mixing, pumping or conveying equipment while still effectively sealing the porous zone in the borehole. The composition and method of the present invention succeed in doing this.

SUMMARY OF THE INVENTION

It is, therefore, the primary object of the present invention to provide an improved composition and method for the sealing and plugging of porous subterranean formations.

It is also an object of the present invention to provide a composition that is capable of controlling the loss of drilling fluids into porous or fractured subterranean formations.

It is another object of the present invention to provide a method of drilling a well into the earth whereby the phenomenon of loss of the drilling fluid into porous or fractured formations is substantially or entirely eliminated.

It is another object of the present invention to provide a composition and method that is capable of plugging and sealing porous zones within subterranean formations by introducing a plug or pill into the borehole that is useful for sealing discrete, periodic high porosity zones within a formation.

It is yet another object of the present invention to provide a composition and method that is capable of plugging and sealing frequently encountered porous zones or continuous porous zones within a formation penetrated by a well or borehole by using the composition as a drilling fluid.

It is a further object of the present invention to provide a composition and method that is capable of stabilizing boreholes, especially horizontal boreholes in unstable formations such as gravel or loose sand formations, particularly where the borehole must be temporarily abandoned or left idle, so that it can remain intact and can be re-entered at a later time and the drilling can be continued without interference from hole collapse.

It is also an object of the present invention to provide a composition that is capable of controlling the loss of excavation fluids into porous subterranean formations.

It is another object of the present invention to provide a method of excavation into the earth whereby the phenomenon of loss of excavation fluid into porous or fractured formations is substantially alleviated or eliminated entirely.

It is another object of the present invention to provide a composition and method that is capable of sealing and plugging porous zones within subterranean formations by introducing a plug or pill into excavation trench, pit or hole that is useful for sealing discrete, periodic high porosity zones within a formation.

It is yet another object of the present invention to provide a composition and method that is capable of sealing and plugging frequently encountered porous zones or continuous porous zones in a formation intersected by an excavation trench, pit or hole by using the composition as an excavation fluid.

It is a further object of the present invention to provide a composition and method that is capable of stabilizing excavated trenches, pits or holes in unstable formations such as gravel or loose sand formations, particularly where the excavation must be temporarily abandoned or left idle, so that it can remain intact and can be re-entered at a later time and the excavation can be continued without interference from wall collapse.

Other objects and advantages of the present invention will become apparent as a description thereof proceeds.

The present invention is directed toward a unique composition and method useful for the sealing and plugging of zones of highly porous, subterranean formations that may be encountered during the drilling of holes using the technique of horizontal directional drilling. The invention may also be used for plugging and sealing permeable formations encountered during the drilling of vertical bore holes, such as those drilled for water, mineral exploration and environmental monitoring wells, oil and gas exploration wells or for any other type of well. The invention may further be used for sealing and plugging zones of high permeability in formations encountered during excavation of trenches using the technique known as slurry trench excavation, or any other subterranean hole, void or gap encountered during any boring or excavation in order to limit or prevent the movement of water through it.

In particular it has been found that the injection into the bore hole of a suspension comprised of water, or an aqueous, clay-based drilling fluid, mixed with granular bentonite and granular water-insoluble, water-swellable, cross-linked polyacrylamide that have been coated with a non-cross linked, water-soluble, high molecular weight polymer substantially and unexpectedly seals and plugs high permeability formations that are encountered during drilling without causing plugging of the mixing, pumping or conveying equipment or, without forming a troublesome plug in the borehole that might impede further drilling or excavation.

DESCRIPTION OF THE PREFERRED EMBODIMENTS

In most boring and drilling operations a drilling fluid is required to lubricate the drill pipe, cool the drill bit, provide positive pressure to support the borehole wall and carry the drill cuttings away from the drill bit and back to the surface leaving the borehole clean and substantially free of cuttings. Loss of the drilling fluid to porous subterranean formations requires that the drilling fluid be replaced by injecting additional drilling fluid into the borehole to keep it full. Where the loss of drilling fluid to the formation is significant and cannot be fully and immediately replaced the ability to circulate the fluid in the hole may be compromised. Severe loss of drilling fluid removes hydrostatic support of the borehole and may allow the borehole wall to collapse. For this reason control of the loss of drilling fluids to porous formations is critical to any drilling operation.

Drilling fluids have been adapted for use in the civil engineering practice of slurry trench excavation. Here, as in drilling the fluid acts to provide positive hydrostatic support for the walls of the trench during the excavation and backfilling processes. Using this technique it is possible to excavate trenches to depths of several hundred feet even in loose or unstable formations. Rapid loss of excavation fluid to porous formations can leave the walls of a trench insufficiently supported. This often leads to collapse of the trench wall(s). As a result, control of the loss of excavation fluids to porous subterranean formations is critical to successful slurry trenching operations.

In all cases where drilling or excavation fluids are being lost to the formation the choice of sealant to be used to eliminate this problem hinges on which sealant composition will adequately resist the forces being placed upon it so that it remains in place and produces an effective seal. In vertical boreholes and trenches the primary force on the formation will be the hydrostatic pressure produced by the weight of the column of fluid in the hole or trench pressing against the formation. The deeper the borehole or trench is the greater the hydrostatic force against the formation and the greater the potential for loss of drilling fluids to it. In shallow, relatively flat boreholes that are produced in horizontal directional drilling the hydrostatic forces against a formation are relatively small and constant. The hydrostatic force of the column of fluid in the borehole or trench is, therefore, the principal force that must be resisted by a formation sealant.

Granular bentonite, in a wide variety of sizes and shapes, provides a superior sealant material for sealing and plugging many types of subterranean voids. Bentonite must be used with care, however, due to its characteristic of rapidly hydrating and swelling when placed in water. This becomes increasingly evident as the size of the bentonite particle becomes smaller exposing greater surface area to the water. In drilling operations of all types it is well known that granular bentonite has a propensity for clogging pumps, drill pipe, conveying lines and drill bits if it is not used with great care. Problems of this type may develop even when the particles of bentonite are treated with coatings to delay the hydration and swelling of the clay. The rapid hydration and swelling capability of bentonite also makes it difficult to ensure that the bentonite particles are properly placed within a porous formation. Most often, the granular bentonite merely forms a layer on the surface of the borehole without penetrating into the formation. Once drilling resumes, after placement of a bentonite seal, the action of the drill pipe and moving drilling fluid in the borehole can displace or damage this borehole wall-surface seal allowing the continued loss of drilling fluid to the formation. Where granular bentonite can be successfully placed into the formation before it has substantially hydrated so that it can swell in situ it will form a very effective and durable seal, however.

Particulate, water-insoluble, water-swellable polymers, often termed "super absorbent" polymers, do not possess many of the adverse characteristics of granular bentonite. Although this class of polymer materials does possess the capacity to very rapidly hydrate and swell upon contact with water the highly plastic gel particles or "blobs" that result are not sticky and do not tend to clog pumps, pipes, hoses and drill bits. The gel blobs will also readily penetrate into the pores of a porous subterranean formation if they are of a suitable size. The size of the gel blobs depends entirely on the particle size of the dry, water-swellable polymer prior to hydration. These properties allow the gelled polymer particles to be packed into the formation voids forming a seal within the formation that can escape the mechanical damage that the borehole surface-deposited bentonite seals may be subjected to. Unfortunately, the hydrated gel blobs exhibit little in the way of cohesive or adhesive properties. This significantly limits their ability to form substantial, durable, in situ seals that are capable of resisting the hydrostatic pressure of the drilling fluid in the borehole as it seeks to escape into the formation. If sufficient hydrostatic pressure is exerted upon these seals the fluid will pass between the gelled polymer particles and continue to escape into the formation.

Unexpectedly, we have found that the problems exhibited by each of these materials, when used independently for porous, subterranean formation sealing, may be overcome by employing the materials together in one formulation. We have discovered that a combination of granular bentonite and granular water-insoluble, water-swellable polymer provides a sealant material that is easily prepared, does not tend to clog equipment, penetrates into the formation and forms a durable, hydrostatic pressure-resistant seal that substantially reduces or eliminates further loss of drilling or excavation fluid into the porous, subterranean formation. We have also discovered that this mixture will, when left in the bore hole or trench, provide substantial support for the walls of the structure and help to keep them from collapsing over extended periods of inactivity. We have further discovered that this mixture may be used as a general drilling fluid, rather than as a plug or pill, to control more minor or less site specific loss of fluid into less porous subterranean formations.

The present invention comprises a dry, homogenous mixture of clay, especially any clay exhibiting swelling characteristics when contacted by water or an aqueous liquid, and a water-insoluble, water-absorbent, water-swellable, cross linked polymer, which mixture is then coated with a liquid, water-soluble polymer. The group of clay minerals that may be used in the present invention includes, but is not limited to, bentonite, montmorillonite, hectorite, nontronite, saponite, beidellite, attapulgite (palygorskite) and sepiolite. Water-insoluble, water-absorbent, water-swellable, cross linked polymers useful in the present invention may be any polymer exhibiting these characteristics regardless of its chemical composition. Most particularly these polymers are comprised of the group of cross-linked polyacrylamide polymers. One example of such a polymer that provides exemplary performance in the present invention is Alcosorb 400, manufactured by Ciba Specialty Chemicals of Suffolk, Va. It should be specifically noted that the identification of this polymer is not intended to be construed as limiting in any way the type of water-swellable polymers that may be used in the dry mixture of the invention. U.S. Pat. No. 4,059,552 (Zweigle, et al.), and U.S. Pat. Nos. 4,182,417 and 4,282,928 (McDonald, et al.) disclose this class of polymer and are incorporated by reference in their entirety herein.

Generally, the dry mixture provided for in the invention comprises, on a weight to weight basis, from about 0.1 to 99.9% clay and from about 0.1 to 99.9% water-swellable polymer. More particularly the mixture comprises from about 50 to 99% clay and from about 1 to 50% water-swellable polymer (wt.:wt.). In its preferred embodiment the mixture comprises from about 80 to 99% clay and from about 1 to 20% water-swellable polymer (wt./wt.). The dry ingredients may be mixed in any mixer capable of producing a homogenous blend of granular materials without significantly degrading the integrity of the materials so as to produce clay or polymer fines or dust. Mixers that are particularly effective for blending the dry ingredients include, but are not limited to, those known as paddle-mixers, ribbon blenders and Rollo-Mixers.

The resulting mixture of granular clay and water-swellable polymer may then be added to water or a water-based drilling fluid and pumped down the borehole and out into the porous formation. We have found that the pumping and placement of the sealant mixture under these conditions must occur soon after the dry ingredients are added to the fluid in order to ensure that they are not substantially hydrated and swollen prior to entering the porous formation. This can be difficult to accomplish due to the very rapid rate of hydration and swelling that characterize these materials.

In order to increase the ease with which the present invention may be practiced it is desirable to delay the onset of substantial hydration and swelling of the clay and water-swellable polymer until these materials are placed within the porous formation. One method of ensuring that the clay and polymer particles remain in a substantially un-hydrated form prior to placement in the porous formation is to mix them with an oil or oil-based drilling fluid to form a pill which can then be pumped down the drill pipe and forced under pressure into the formation. Upon contact with water within the formation the clay and polymer particles will hydrate and swell. If no water is present in the formation then the placement of the oil-based pill must be followed with water or a water-based drilling fluid which, as it moves out into the formation and contacts the clay and water-swellable polymer of the present invention, will cause these materials to hydrate and swell in situ.

In another embodiment of the present invention the particles of clay and water-swellable polymer may be added to the oil-based continuous phase of a water-in-oil emulsion and then pumped down the hole. Alternatively, the particles of clay and water-swellable polymer may be mixed with the oil-based discontinuous phase of an oil-in-water emulsion. Emulsions of these types may contain a variety of emulsifiers and de-emulsifiers to aid in the performance of the emulsion In either case, the oil or oil based fluid in which the clay and water-swellable polymer particles are suspended keeps these particles from coming in contact with the water in the emulsion. When the emulsion is passed, under high pressure, through the nozzle jets in the drill head it is subjected to very high shearing forces that destabilize the emulsion. As a result, the clay and water-swellable particles within the oil-based phase are allowed to come into contact with the water in the aqueous phase of the emulsion and begin to hydrate and swell. This prevents premature hydration of the clay and water-swellable polymer and helps to ensure that most hydration and swelling occurs within the formation after the particles are placed there.

For many types of applications the adverse environmental consequences of using oil or oil-based drilling fluids is unacceptable. This is particularly true for near-surface applications such as horizontal directional drilling or slurry trench excavation where the oil in the fluid may contaminate ground water or soils rendering them unusable. We have found that a useful alternative for retarding the rate of hydration of the clay and water-swellable polymer particles may be accomplished by pre-coating the particles with a liquid, water resistant material. Although this process may take place separately for each of the two solid ingredients, followed by mixing the coated, solid ingredients together to form the final product blend, we have found that it is more cost effective to apply the coating after the dry ingredients have been pre-blended. Pre-blending also produces a better and more uniform finished product without any wet surfaces on the cross-linked polymer granules. Wetted particle surfaces often occur if the granular water-swellable polymer is coated separately. Wetting occurs because the polymer particles, unlike the clay particles, are hard and essentially non-porous and do not tend to absorb the non-aqueous liquids used as carriers in the preferred types of coating materials.

Unexpectedly, we have found that application of the water-resistant coating to a blend of clay and water-swellable polymer eliminates the problem of wetted polymer granule surfaces. This occurs because the water-swellable polymer granules become coated with a small amount of the fine bentonite dust that is present in the dry, granular bentonite. As the liquid coating is applied to the mixture the liquid that comes in contact the water-swellable polymer granules is absorbed by the dust on the surface of the granules. This stabilizes the liquid coating helping to keep it in place and to prevent the formation of wetted polymer particle surfaces. Care must still be taken to avoid over application of coating liquid. If the capacity of the clay dust to absorb the liquid coating is exceeded the formation of wetted polymer particle surfaces will again occur.

Particularly effective water resistant materials that may be used as coating materials in the present invention comprise the group of liquid, high molecular weight, water-soluble polymers that are of a type known to those who are knowledgeable in the art as "shale stabilizers". In the present invention these polymers act to form a protective layer around the clay and the water-swellable polymer particles. Most useful of these polymers are those that are available in an oil emulsion form as these will not cause the particles of bentonite and water-swellable polymer to begin to swell as would a polymer in aqueous solution. The water-soluble polymer coating functions to delay the hydration and swelling of the particles when the particles are mixed with water or an aqueous fluid. Many types of shale stabilizing polymers exist. Very typically these comprise members of the group of polymers known as polyacrylamides or polyacrylamide-polyacrylate co-polymers. They may also comprise members of the group of natural or synthetic gums as well as other polymer materials. Two examples of this class of water-soluble polymer having exemplary characteristics for use in the present invention are Percol E38 and Percol E40, manufactured by Ciba Specialty Chemicals of Suffolk, Va. Identification of these polymers is not intended to be construed as limiting in any way the water-soluble polymers that may be used to coat the dry mixture of the invention. U.S. Pat. Nos. 4,463,808 and 4,568,708 (Mason) disclose this class of polymer and are incorporated by reference in their entirety herein.

In the practice of the present invention the application rate of the water resistant, water-soluble polymer coating to the clay and water-swellable polymer mixture is dependent upon the type of water-soluble polymer and the nature of the carrier fluid with which it is prepared. It should be further noted that the amount of water-soluble polymer applied to coat the dry ingredients will depend upon the concentration of water-soluble polymer in the carrier fluid. This varies widely between polymer manufacturers and even between products from a single manufacturer. For the water-soluble polymers that have been noted as possessing exemplary characteristics for use in the present invention the rate of addition is from about 0.01 to 15 gallons of water-soluble polymer per 2000 pounds of dry clay/water-swellable polymer mixture. More particularly the application rate is from about 1.0 to about 6.0 gallons of water soluble polymer per 2000 ponds of dry mixture. In the preferred embodiment of the present invention the application rate for the liquid, water-soluble polymer coating is about 2.0 to 5.0 gallons per 2000 pounds of dry mixture.

Liao, in U.S. Pat. No. 6,105,674 teaches that a liquid polymer may be applied to granular bentonite at a rate of from about 0.03 to 0.50 milliliters per gram of clay (7.19 to 11.98 gallons of polymer per 2000 pounds of clay) to delay the onset of hydration and swelling of the bentonite. In this regard, the present invention is unique and distinguishable from that of Liao in that the application rate of the water resistant, water-soluble polymer coating to the dry, granular ingredients is substantially lower and, as a result, enables a more cost effective product to be produced. It should be noted that the rates of water-soluble polymer addition are representative of those found to be useful for the polymers indicated to have exemplary characteristics for the present invention. These rates are not to be interpreted as limiting in any way where other polymer materials or other polymer-in-carrier fluid concentrations are used.

Application of the water-soluble polymer coating to the mixture of clay and water-swellable polymer particles may be accomplished by any means that will ensure a thorough and complete coating of the particles. Incomplete coating of the particles will result in premature hydration and swelling when the material is mixed for use. We have found that the use of properly positioned airless spray nozzles located within the mixing chamber of a paddle mixer provide a superior method for evenly applying the coating of water resistant material to the dry clay and water-swellable polymer mixture.

The clay and water-swellable polymer used in the composition of the present invention may be of any particle size that can be conveniently mixed with water or drilling fluid such that the resulting fluid may be pumped through a drill pipe, or hose, and drill bit nozzle and allow the particles entrained in the fluid to enter into the porous subterranean formation in an incompletely hydrated form so that final hydration and swelling can then occur in situ. Although the clay and the water-swellable polymer may be in the form of a powder composed of fine particles we have found that they are most useful when present in a larger particle, or granular form. It is well known that the rate of hydration and swelling of the dry ingredients used in the present invention is a surface area dependent phenomenon where rate of hydration increases as surface area increases. When the clay and water-swellable polymer are present in the form of very fine particles the rate of hydration and swelling becomes so rapid that it appears to occur immediately upon contact with water. Substantial hydration of the mixture prior to its placement in the porous formation is undesirable because of the increased difficulty of accurately and completely placing the mixture within the formation. For this reason, we have found that it is most useful if both the clay and the water-swellable polymer are present in a granular form having a particle size of about 200 mesh (ASTM) or larger. We have also found that, in most applications, the particles in the composition will exhibit the best performance if they are substantially from about 100 mesh (ASTM) to 0.25 inch in size, and more particularly from about 40 mesh (ASTM) to 8 mesh (ASTM). In the preferred embodiment of the present invention the particles will be substantially within the range of about 20 to 8 mesh (ASTM). We have also found that it is desirable, though not critical, for the granules of both materials to be of approximately equal size and distribution of sizes in order to limit segregation of the clay and water swellable polymer during packaging, handling and transportation.

The product thus produced may be employed by mixing it with water or a water-based drilling or excavation fluid such as bentonite and water, or bentonite, polymer and water at the rate of from about 0.1 pounds to 150 pounds of product per 100 gallons of water or fluid. Where preparation of a pill of sealant material is desirable for sealing discrete zones of high permeability an addition rate of about 20 to 80 pounds of product per 100 gallons of fluid is useful with the preferred embodiment of the present invention having an addition rate of about 30 to 60 pounds per 100 gallons of fluid. When the product is used as a drilling fluid for more general sealing a useful fluid may be prepared using from about 0.1 to 30 pounds of product per 100 gallons of fluid. In the preferred embodiment of the present invention an exemplary drilling fluid with excellent sealant properties may be produced using an addition rate of about 2 to 20 pounds of product per 100 gallons of fluid. These types of drilling fluids are conventional in nature, and are well recognized in the art of excavating/drilling into subterranean cavities, and a further description is not deemed necessary for understanding of the invention. In general, drilling fluids for this invention include a water-based fluid which also contains at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

The fluid suspension of the present invention may be prepared by mixing in any low shear mixing device to incorporate the dry ingredients into the liquid. Although the mixture may remain in the mixing tank for some time after the dry ingredients are added it is most advantageously pumped through the drilling pipe or slurry hose and placed in the bore hole or trench in the area of the porous formation immediately after the dry ingredients have been dispersed in the liquid.

In vertical boreholes and excavations the weight of the column of fluid above the porous zone pushes the fluid into the formation. As the depth of the borehole or excavation increases the hydrostatic pressure of the column of fluid also increases. For this reason the insertion of the sealing and plugging composition of the present invention into the porous formation in vertical boreholes and excavations may be accomplished relatively easily. When a pill of fluidized sealant is injected into the borehole or excavation in the area where fluid is being lost to the formation the hydrostatic pressure of the column of fluid above it will force the plugging material into the permeable zone until it becomes sealed and fluid flow ceases. Where there is no specific zone of high permeability in the subterranean formation, and lost circulation occurs at low rates throughout a larger area, the use of the plugging material of the present invention as a drilling or excavation fluid will substantially limit or prevent further loss of fluid by infiltrating the pores of the formation, generally, as the fluid moves into the formation. This process will continue until the leaking formation is substantially sealed.

In the relatively shallow horizontal boreholes produced using the technique of horizontal directional drilling the hydrostatic pressure of the drilling fluid against the formation is relatively low. Despite this it is commonplace for drilling fluids to be largely lost to the formation during drilling with little or no fluid returning to the surface entry point to be cleaned and re-circulated. The lack of significant hydrostatic pressure in the borehole makes it more difficult to force sealant materials into a porous formation that may be penetrated by a borehole. This requires that the sealant be able to flow easily into the porous formation under the influence of the relatively small pressure placed on the formation by the fluid as it is pushed from the drill pipe into the borehole. The composition of the present invention is able to do this.

In an additional embodiment of the present invention natural or man-made fibers may be added to the dry composition such that when the composition is added to water or drilling fluid the fibers are homogenously mixed with and thoroughly dispersed in the sealing composition. When this composition is pumped into the porous formation as previously described the fibers will be carried into the formation along with the other ingredients in the sealing composition. When, after setting for a period of time, the prepared sealant composition gels in the formation pores the fibers will provide an interlinking frame work to more fully tie together and stabilize it. The use of fiber additives in the sealant composition, while not necessary to achieve a gelled, set sealant mass within a formation, will effectively reduce the potential for unwanted migration of the gelled sealant in deeper holes with high hydrostatic pressures or in horizontal bores having high fluid backpressures. Additionally, the use of fibers in the sealant composition will tend to reduce the depth of penetration of the still fluid sealant into the porous formation during its initial placement thereby increasing the efficiency of use of the composition. Fiber that may be usefully mixed with the dry composition to accomplish this result include any water insoluble man-made or natural fiber or fibrous material capable of being reduced to substantially individual fibers and capable of being cut or chopped into lengths suitable for use in any particular application. Examples of fibers that would be useful in the present invention include fibers of polyethylene, polypropylene, nylon, rayon, polyester, hemp, cotton, wool, disassociated wood fibers and fiberglass. This list is not intended to be exhaustive is not intended to limit in any way the scope of fiber composition, chemistry or makeup which may be usefully employed in the present invention.

As such, an invention has been disclosed in terms of preferred embodiments thereof which fulfills each and every one of the objects of the present invention as set forth above and provides new and improved method of sealing porous subterranean formations, a composition for such sealing, and a method of making the composition.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A composition for use in sealing a porous subterranean formation comprising a mixture of effective amounts of water swellable clay and a water-insoluble, water-absorbent, water-swellable polymer capable of penetrating into the porous subterranean formation and forming a durable, hydrostatic pressure-resistant seal that substantially reduces or eliminates loss of drilling or excavation fluids, each of the water swellable clay and the water-insoluble, water-absorbent, water-swellable polymer having an external coating consisting of an effective amount of a material capable of retarding the rate of penetration of water through the coating.

2. The composition of claim 1, wherein the material capable of retarding the rate of penetration of water through the external coating comprises a liquid high molecular weight water soluble polymer.

3. The composition of claim 1, wherein a mixture of the water swellable clay and the water insoluble, water absorbent, water swellable polymer of the composition comprises between 0.1 and 99.9% by weight of the clay and between 0.1 and 99.9% of the water swellable polymer.

4. The composition of claim 3, wherein the clay ranges between 80 and 99% and the water-insoluble, water-absorbent, water swellable polymer ranges between 1 and 20%.

5. The composition of claim 1, wherein the water-insoluble, water-absorbent, water-swellable polymer is a cross linked polyacrylamide polymer.

6. The composition of claim 2, wherein the effective amount of the external coating is based on 0.01 to 15 gallons of the water penetration resistant liquid material per 2000 pounds of a dry mixture of the clay and water-insoluble, water-absorbent, water swellable polymer.

7. The composition of claim 1, wherein the clay is selected from the group consisting of bentonite, montmorillonite, hectorite, nontronite, saponite, beidellite, attapulgite, and sepiolite.

8. The composition of claim 2, wherein the liquid high molecular weight water soluble polymer is a polyacrylamide or a polyacrylamide-polyacrylate co-polymer or a mixture of the two.

9. The composition of claim 1, wherein the clay and the water-insoluble, water-absorbent, water swellable polymer have a particle size of 200 mesh (ASTM) or greater.

10. The composition of claim 1, wherein the coated mixture contains an effective amount of water insoluble fibrous material to enhance integrity of a seal formed by use of the coated mixture in a subterranean formation.

11. A method of making a coated mixture for use in sealing a porous subterranean formation comprising:
   a) forming a dry mixture of an effective amount of a particulate water swellable clay with an effective amount of a particulate water insoluble, water absorbent, water swellable polymer, the effective amounts being capable of penetrating into the porous subterranean formation and forming a durable, hydrostatic pressure-resistant seal that substantially reduces or eliminates loss of drilling or excavation fluids; and
   b) coating the clay and water-insoluble, water-absorbent, water-swellable polymer particles with an effective amount of a material capable of retarding the rate of water penetration through the coating to form the coated mixture.

12. The method of claim 11, wherein the material capable of retarding the rate of water penetration through the coating comprises a liquid high molecular weight water soluble polymer.

13. The method of claim 11 wherein the effective amount of the external coating is based on 0.01 to 15 gallons of the water penetration resistant liquid material per 2000 pounds of the dry mixture.

14. The method of claim 11, wherein the mixture of the water swellable clay and the water insoluble, water absorbent, water swellable polymer of the composition comprises between 0.1 and 99.9% by weight of the clay and between 0.1 and 99.9% of the water swellable polymer.

15. The method of claim 14, wherein the clay ranges between 80 and 99% and the water-insoluble, water-absorbent, water swellable polymer ranges between 1 and 20%.

16. The method of claim 11, further comprising adding an effective amount of water insoluble fibrous material to the coated mixture to enhance the integrity of a seal formed by a use of the coated mixture in a subterranean formation.

17. The method of claim 11, wherein the water-insoluble, water-absorbent, water swellable polymer is a cross linked polyacrylamide polymer.

18. The method of claim 11, wherein the clay and the water-insoluble, water-absorbent, water swellable polymer have a particle size of 200 mesh (ASTM) or greater.

19. The method of claim 12, wherein the liquid high molecular weight water soluble polymer is a polyacrylamide or a polyacrylamide-polyacrylate co-polymer or a mixture of the two.

20. The method of claim 11, wherein the clay is selected from the group consisting of bentonite, montmorillonite, hectorite, nontronite, saponite, beidellite, attapulgite, and sepiolite.

21. A method of sealing a porous formation in a subterranean cavity comprising:
   a) suspending an effective amount of the coated mixture of claim 1 in an aqueous-based liquid to form a fluid suspension;
   b) introducing the fluid suspension into a subterranean cavity wherein the clay and water-insoluble, water-absorbent, water swellable polymer seal the porous formation.

22. The method of claim 21, wherein the aqueous based liquid is one of water or a water-based drilling fluid.

23. The method of claim 22, wherein the drilling fluid comprises water and bentonite.

24. The method of claim 21, wherein the fluid suspension is introduced either generally vertically or generally horizontally in subterranean cavity.

25. The composition of claim 6, wherein 1.0 to 6.0 gallons of the water penetration resistant liquid material are used per 2000 pounds of the dry mixture.

26. The composition of claim 9, wherein the clay and the water-insoluble, water-absorbent, water swellable polymer have a particle size of about 100 mesh (ASTM) to 0.25 inch.

27. The composition of claim 26, wherein the clay and the water-insoluble, water-absorbent, water swellable polymer have a particle size of about 40 mesh (ASTM) to 8 mesh (ASTM).

28. The composition of claim 10, wherein the fibrous material is comprised of one or more of polyethylene, polypropylene, nylon, rayon, polyester, hemp, cotton, wool, disassociated wood fibers and fiberglass.

29. The method of claim 13, wherein 1.0 to 6.0 gallons of the water penetration resistant liquid material are used per 2000 pounds of the dry mixture.

30. The method of claim 16, wherein the fibrous material is comprised of one or more of polyethylene, polypropylene, nylon, rayon, polyester, hemp, cotton, wool, disassociated wood fibers and fiberglass.

31. The method of claim 18, wherein the clay and the water-insoluble, water-absorbent, water swellable polymer have a particle size of about 100 mesh (ASTM) to 0.25 inch.

32. The method of claim 31, wherein the clay and the water-insoluble, water-absorbent, water swellable polymer have a particle size of about 40 mesh (ASTM) to 8 mesh (ASTM).

* * * * *